(12) United States Patent
Fisk

(10) Patent No.: US 12,312,161 B2
(45) Date of Patent: May 27, 2025

(54) STORAGE TANK MONITORING APPARATUS AND METHODS

(71) Applicant: AXON4D CORP., Airdrie (CA)

(72) Inventor: Jared Johan Fisk, Airdrie (CA)

(73) Assignee: Axon4D Corp., Airdrie (CA)

( * ) Notice: Subject to any disclaimer, the term of this patent is extended or adjusted under 35 U.S.C. 154(b) by 208 days.

(21) Appl. No.: 17/996,220

(22) PCT Filed: Apr. 14, 2021

(86) PCT No.: PCT/CA2021/050500
§ 371 (c)(1),
(2) Date: Oct. 13, 2022

(87) PCT Pub. No.: WO2021/207837
PCT Pub. Date: Oct. 21, 2021

(65) Prior Publication Data
US 2023/0219746 A1    Jul. 13, 2023

Related U.S. Application Data

(60) Provisional application No. 63/009,646, filed on Apr. 14, 2020.

(51) Int. Cl.
| | |
|---|---|
| *G02B 6/44* | (2006.01) |
| *B65D 88/42* | (2006.01) |
| *B65D 88/46* | (2006.01) |
| *B65D 90/48* | (2006.01) |
| *G01K 11/3206* | (2021.01) |

(52) U.S. Cl.
CPC ............ *B65D 90/48* (2013.01); *B65D 88/42* (2013.01); *B65D 88/46* (2013.01); *G01K 11/3206* (2013.01); *G02B 6/44* (2013.01)

(58) Field of Classification Search
CPC .................................................. G01K 11/3206
See application file for complete search history.

(56) References Cited

U.S. PATENT DOCUMENTS

| | | | |
|---|---|---|---|
| 6,973,245 B2 | 12/2005 | Bocanegra et al. | |
| 2010/0296080 A1* | 11/2010 | Nishikawa | G01N 21/431 |
| | | | 356/128 |

(Continued)

FOREIGN PATENT DOCUMENTS

| | | |
|---|---|---|
| CN | 202575116 U | 12/2012 |
| CN | 204056863 | 12/2014 |

(Continued)

OTHER PUBLICATIONS

Butov et al., "All-fiber highly sensitive Bragg grating bend sensor", Sensors, (2019), 19, 4228.

(Continued)

*Primary Examiner* — Eric Wong
(74) *Attorney, Agent, or Firm* — Foley IP Law, PLLC

(57) ABSTRACT

Apparatus and methods for measuring the deformation in a floating-roof seal assembly. A fiber optic cable is attached along its length to the floating-roof seal assembly such that the fiber optic cable is deformed when the floating-roof seal assembly is deformed. Deformation of the fiber optic cable and the seal assembly can be determined based on how the light interacts with the fiber optic cable. This helps allow tanks with a floating roof to be monitored.

20 Claims, 7 Drawing Sheets

(56) References Cited

U.S. PATENT DOCUMENTS

2016/0229627 A1* 8/2016 Joosten ................. G01F 23/292
2017/0138802 A1* 5/2017 Fisk ....................... G01K 13/00

FOREIGN PATENT DOCUMENTS

| CN | 204264757 | | 4/2015 |
| CN | 204264757 U | * | 4/2015 |
| CN | 107215580 A | | 9/2017 |
| CN | 207917687 | | 9/2018 |
| JP | H03683 A | | 1/1991 |

OTHER PUBLICATIONS

McJones, et al., "Floating Roof Tank With Sealed Gauging Pole," Jan. 5, 1999, 6 pages.

* cited by examiner

STORAGE TANK MONITORING APPARATUS AND METHODS

FIELD OF THE INVENTION

The invention relates to measuring and monitoring a floating roof tank. In particular, the technology relates to measuring and monitoring how seals are deforming using one or more fiber optic cables.

BACKGROUND

A floating roof tank is a storage tank commonly used to store large quantities of petroleum products such as crude oil or condensate. It typically comprises a cylindrical shell equipped with a roof that floats on the surface of the stored liquid. The roof rises and falls with the liquid level in the tank. This helps to eliminate tank breathing loss and to reduce the evaporative loss of the stored liquid.

There is typically a rim seal assembly between the tank shell and roof to reduce rim evaporation. The seals are somewhat flexible in nature to navigate the shell deformations and welds that are present on the shell.

Most countries require that floating roof tanks are periodically inspected. For example, in the U.S. External Floating Roof seals are mandated by the EPA (United States Environmental Protection Agency) to be measured and inspected on an annual basis for damage and gaps to the shell while the tank is In-Service. This task generally requires people to wear clean breathing apparatus and a very comprehensive safety watch and rescue plan. Obtaining the data to ensure emissions are stopped and the environment is protected is important.

SUMMARY

In accordance with the present disclosure, there is provided an apparatus for measuring the deformation in a floating-roof seal assembly comprising:
- a deformable floating-roof seal assembly configured to span between a rigid section of a floating roof and components of a container;
- a fiber optic cable assembly comprising one or more fiber optic cables, each fiber optic cable being attached along its length to the floating-roof seal assembly such that each fiber optic cable is deformed when the floating-roof seal assembly is deformed;
- a light source configured to transmit light along each fiber optic cable; and
- a receiver configured to detect light from each fiber optic cable after it has interacted with the fiber optic cable.

The fiber optic cable assembly may comprise multiple fiber optic cables arranged in parallel about a common fiber optic cable assembly axis. The receiver may be configured to determine the deformation using differences between the responses of the multiple fiber optic cables within the assembly. The fiber optic cable assembly may comprise at least three fiber optic cables arranged such that they do not all lie in the same plane. This configuration would allow curvature to be measured in two different directions at a particular point along the fiber optic cable assembly axis.

A storage tank may comprise a container and a floating roof. The container may comprise a shell (e.g. a wall configured to retain liquid), a floor and one or more internal columns. The floating roof comprises a rigid portion and one or more deformable seal assemblies. The rigid portion may comprise a float for allowing the roof to float on the liquid stored within the container. The container may comprise a fixed roof above the floating roof.

The deformable floating-roof seal assembly may comprise deformable components which are made of a deformable or resilient material. The deformable floating-roof seal assembly may comprise multiple rigid components which are connected together to allow relative movement between the rigid components to facilitate deformation (e.g. an articulated arm).

The deformable floating-roof seal assembly may be configured to reduce rim evaporation. The deformable floating-roof seal assembly may form a substantially airtight seal between the rigid section of the roof and the container.

The floating-roof seal assembly may comprise a skirt of resilient material. The skirt may be of unitary construction. The skirt may comprise multiple connected or overlapping sections.

The floating-roof seal assembly may comprise multiple skirts of resilient material.

The floating-roof seal assembly may be configured to span a gap between a rigid section of the floating roof and walls of a tank shell.

The floating-roof seal assembly may be configured to span a gap between a rigid section of the floating roof and internal columns within a tank shell.

The fiber optic cable may extend around at least ¾ of the diameter of the floating roof. The fiber optic cable may extend around at least ½ of the diameter of the floating roof.

The fiber optic cable may undulate with respect to a sealing axis of the seal assembly. The sealing axis may be considered to be aligned with the gap which the seal assembly spans.

The apparatus may comprise a controller configured to:
- receive data from the receiver; and
- determine a measure of spatially resolved deformation of the fiber optic cable assembly based on the received data.

The apparatus may comprise and/or receive information from a sensor configured to measure the height of the floating roof relative to the container (e.g. above the container floor). The sensor may comprise a radar sensor connected to the container above the roof and configured to measure the height by reflecting a beam off the top of the roof. The sensor may comprise a float level gauge. A float level gauge may comprise a float (e.g. the roof itself) connected to a measuring rope which is let out or reeled in as the float moves up and down. How much the rope is let out is related to the height of the float. The float may be guided by guide cables.

The apparatus may comprise a wireless transceiver for transmitting data from the apparatus to a remote computer.

A said fiber optic cable may comprise one or more fiber Bragg gratings.

The receiver may be configured to detect interactions with the fiber optic cable in one or more of the following modes: Rayleigh, Brillouin, Raman and time-of-flight.

The apparatus may be configured to allow distributed chemical sensing based on the spatially resolved interaction of the light with the fiber optic cable.

The apparatus may comprise multiple fiber optic cables or multiple fiber optic cable assemblies, each cable or assembly being attached along its length to a different deformable component of the floating-roof seal assembly.

Different fiber optic cables may be configured to measure deformation at different azimuthal ranges.

Different fiber optic cables may be configured to measure deformation at different heights.

The apparatus may be configured to provide an alert when the deformation of the shell meets one or more predetermined criteria. These criteria may be based on, for example, API Standard 650 ("Welded Tanks for Oil Storage", Effective date Feb. 1, 2012) These criteria may include one or more of the following:

Deviation beyond a predetermined roundness value (e.g. API Standard 650 Section 7.5.3 Roundness);

Deviation beyond a predetermined plumbness value (e.g. ½00th of shell height or API Standard 650 Section 7.5.2 Plumbness);

Local deviations beyond a predetermined level;

Deviations (peaking) at vertical weld joints shall not exceed a predetermined value (e.g. 13 mm or ½ in).

Deviations (banding) at horizontal weld joints shall not exceed a predetermined value (e.g. 13 mm or ½ in).

Flat spots measured in the vertical plane shall not exceed a predetermined plate flatness value and/or predetermined waviness value.

The apparatus may be configured to provide an alert when the forces applied to the tank meets one or more predetermined criteria. These criteria may include one or more of the following:

Wind forces exceeding a predetermined wind-force value (which may be related to the overturning stability of the tank—see API Standard 650 Section 5.11); and Seismic forces exceeding a predetermined seismic value.

The apparatus may be configured to provide an alert when the sealing assembly meets one or more predetermined criteria. These criteria may include one or more of the following:

The average width of the open seal gap between the seal and the shell, determined by averaging the minimum gap width and the maximum gap width, exceeding a predetermined average-gap value; and The ratio of open seal gap area (the product of the open seal gap length and average open seal gap width) to vessel diameter for a seal exceeding a predetermined ratio value.

For example, for open seal gaps between the primary seal and the shell, the total accumulated gap area shall not exceed 212 cubic centimeters per meter of nominal diameter (10 square inches per foot of nominal diameter). Maximum open gap allowed may be 3.81 cm (1.5 inches). For open seal gaps between the secondary seal and the shell, the total accumulated gap area shall not exceed 21.2 cubic cm per meter of nominal diameter (1 cubic inches per foot of nominal diameter). Maximum open gap allowed may be 1.27 cm (0.5 inches).

It will be appreciated that the predetermined values may be absolute or relative to the dimensions of the tank.

The apparatus may be configured to continuously monitor deformation.

The light receiver may comprise a photodetector. The light receiver may comprise a time-resolved photodetector. The photodetector may comprise GaAs and/or InGaAs. The wavelength range of sensitivity of the light receiver may be between 500-1630 nm. The bandwidth of the light receiver may be between DC to 26 GHz.

The light receiver may be a optical sensing interrogator such as a Micron Optics™ sm125-500, 130-700 or si155 Standard; HBM™ FS22 or FS42; a Smart Fibers™ SmartScope FBG or SmartScan™ FBG; a FAZT 14G; a Optilab™ FSI-RM-18 or a BaySpec™ WaveCapture™; or a Ibsen™ I-MON.

The refractive index of fiber optic cable may be between 1.4 and 1.5. This corresponds to light speeds within the fiber optic cable, $s_{fo}$, of between 200 and 215 m/μs. To have meter resolution in a backscattering configuration, the photodetector would need to be able to distinguish signals received around 9-10 ns apart ($2 \times 1$ m/$s_{fo}$). Apparatus with higher temporal resolution (e.g. in the picosecond range) would have a higher spatial resolution. The operating wavelength of the fiber optic cable may be between 1460-1650 nm.

The apparatus may be battery powered, be connectable to the mains and/or comprise a renewable power source (e.g. a solar panel and/or a wind turbine).

The apparatus may be configured to monitor for harmonic deformations. Harmonic deformations or vibrations may be indicative of forces being applied to the tank (e.g. by wind or seismic events). The frequency of the harmonic deformations may be in the range of between 20 to 0.01 hertz (e.g. 1 to 0.1 hertz). The frequency of vibrations at a particular point may also be indicative of the strength of the tank, which in turn may be an indication of the thickness of the tank at that point. This may provide a way of monitoring tank wall thickness and/or corrosion.

The system may be configured to scan periodically (e.g. every 500 ms or more frequently). The system may be configured to adjust the sampling rate based on the deformation. For example, the system may be configured to record the data continuously when deformation is taking place, and to reduce the sample rate if no deformation changes are detected (e.g. down to a minimum sampling rate).

The system may be configured to identify characteristic frequencies depending on the position of the roof within the tank. The vibrational frequency may depend on the level of the liquid in the tank and/or the thickness of the shell (typically the lower shell courses are thicker and more rigid and upper course are thinner and more flexible).

According to a further aspect, there is provided a retrofit apparatus for measuring the deformation in a floating-roof seal assembly comprising:

a fiber optic cable configured to be attachable along its length;

a connector for attaching the fiber optic cable along its length to a deformable floating-roof seal assembly configured to span between a floating roof and components of a container, such that the fiber optic cable is deformed when the floating-roof seal assembly is deformed;

a light source configured to transmit light along the fiber optic cable;

a receiver configured to detect light from the fiber optic cable after it has interacted with the fiber optic cable; and a controller configured to determine the deformation of the fiber optic cable based on the detected light.

According to a further aspect, there is provided a method for measuring changes in a storage tank, the tank comprising:
a container for containing a liquid; and
a floating roof comprising a float for floating on the liquid contained within the tank, and a deformable floating-roof seal assembly configured to span between a floating roof and components of the container, a fiber optic cable attached along its length to the floating-roof seal assembly, a light source configured to transmit light along the fiber optic cable; and a receiver configured to detect light from the fiber optic cable after it has interacted with at fiber optic cable;

the method comprising:

transmitting light from the light source into the fiber optic cable;

detecting light received from the fiber optic cable after it is interacted with the fiber optic cable; and determining the deformation of the fiber optic cable based on the detected light.

A deformable component of the seal-assembly to which the fiber optic cable may be attached may comprise one or more of: a single wiper seal; a double wiper seal; a foam block; a foam-block envelope; a shoe plate, a shoe-plate arm; a shoe-plate spring; and a continuous seal.

The apparatus may be configured to perform both Distributed Fiber Sensing (DFS) and Distributed Chemical Sensing (DCS).

Software/firmware may be configured to take the received light from the fiber optic cable to detect shape, status change, rim space variables, the structural shape of the shell and/or the shell settlement. The apparatus would be initialized with the original shape (e.g. determined using LIDAR). From that point a running average of data may be kept. The apparatus may be configured to determine deviations from the initial state (e.g. an absolute change in shape) and from the running average (e.g. to detect accelerating deformations).

Additional sensors may be added in series or parallel to the existing fiber optic arrangement to detect chemical signatures and vibration.

The fiber optic cable sensors may be imbedded within a seal material.

The fiber optic cable sensors may be attached to the surface of the seal assembly as an upgrade package to existing tanks that get the continuous monitoring benefit.

The apparatus may be configured to determine deviation from a reference configuration established during the first storage tank 3D laser scan and modelling. Based on the structural tolerances for the tank, the apparatus may be configured to track the status of the tank in in a continuous way.

Once a scanned model is established as a calibration, the sensors may allow us to track all deviation against that reference footprint.

Upon installation the apparatus is calibrated, connected to an interactive 3D display which reacts to the structural categories of the storage tank along with a notification apparatus for whomever it may concern. The data additionally is long term, tracked and trended for categorical statistical analysis.

The apparatus may be configured to capture and characterize effects of weather conditions (e.g. wind), measurement of seismic activity, liquid turbulence and elastic movement at different liquid levels of operation.

The apparatus may be configured to show strain and the presence of emissions using chemical sensing.

The apparatus may be configured to identify areas of corrosion. Corrosion may affect the shape of the shell (e.g. if rust expands the surface of the shell inwards) or how the seals move across the surface of the shell (e.g. by changing the roughness or coefficient of friction of the shell).

The apparatus may be configured to combine the deformation data with satellite big data collection for larger scale tracking and trend anomalies and analysis.

The apparatus may be configured to allow parallel asset monitoring of multiple tanks. The apparatus may be integrated with facility monitoring.

The fiber optic cable assembly may be a single fiber optic cable. The fiber optic cable assembly may be multiple fiber optic cables arranged in a particular configuration with respect to each other with respect to a fiber optic cable assembly axis.

The fiber optic cable may be applied as a physical film or layer onto, into, or encompassing all surfaces around the seals circumference.

The fiber optic cable may be a single-mode fiber or a multi-mode fiber. The apparatus may be configured to detect shape, temperature, pressure, vibration and/or tension.

The fiber optic cable assembly may be a multicore cable (e.g. the iXblue™ Multicore Fiber IXF-MC-7-SM-1550). For example, the multicore cable may comprise 7 cores in a hexagon & center configuration. Using multicore cable may allow the deformation of the sealing assembly to be more accurately determined because there would be multiple data streams for each position on the sealing assembly, and these data streams would be constrained and related to each other by virtue of the configuration of each core within the multicore cable.

The light source may be a laser (e.g. a laser diode, a fiber laser etc.). The light source may be configured to emit light in the visible (400 nm-700 nm wavelength) and/or IR (700 nm-3 um wavelength) range.

The seal material may depend on the liquid stored in the tank. The seal material may comprise fluoropolymers, urethane and/or nitrile (e.g. for crude oil). The seal material may comprise fluoropolymers, urethane, urethane laminate, fluoroelastomers and/or Buna-N-Vinyl (e.g. for refined petroleum products). The seal material may comprise fluoropolymers and/or nitrile (e.g. for gasoline/methyl tert-butyl ether, or MTBE blend).

The apparatus may be configured to detect the value of, or changes in, of a tank. alignment may be calculated by fitting a best-fit vertical cylinder to all the shell points. The alignment is the deflection of the measured points from this best-fit vertical cylinder.

The apparatus may be configured to detect the value of, or changes in, the roundness of a tank. Roundness may be calculated by fitting a best-fit cylinder to all the shell points, allowing for tilt in the cylinder. The roundness is the deflection of the measured points from this best-fit cylinder. Roundness differs from alignment in that it removes the effect of tilt so that the roundness of the tank can be isolated.

The apparatus may be configured to detect the value of, or changes in, the plumbness of a tank. Plumbness best-fit is calculated by taking all points along a vertical line on the shell and fitting a best-fit-line to it. The plumbness is the deflection of this line from vertical. This is a measure of average plumbness over the entire height of the shell. This same method also applies to internal structure analysis such as columns.

The apparatus may be configured to detect values of, or changes in, peaking of a tank. Peaking may be a local deviation at a vertical weld where the deviation from a horizontal sweep board exceeds the allowable tolerance. Peaking is calculated by creating a theoretical 36" sweep board with a radius equal to the mean radius. The theoretical sweep board is placed at every point along the shell and the deviations from the shell to the sweep board are measured. The maximum deviation observed is recorded for each point.

The apparatus may be configured to detect values of, or changes in, banding of a tank. Banding is a local deviation at a horizontal weld where the deviation from a vertical straight edge exceeds the allowable tolerance. Banding is calculated by creating a theoretical 36" straight edge. The theoretical straight edge is placed at every point along the shell and the deviations from the shell to the straight edge are measured. The maximum deviation observed is recorded for each point.

The apparatus may be configured to detect values of, or changes in, column deflection. Column deflection shows the horizontal deflection of the column with respect to the base of the column. The deflection is shown in the plane of greatest deflection (deflection plane).

In accordance with the present disclosure, there is also provided an apparatus for measuring the deformation a tank, wherein the apparatus comprises a tank with a deformable component;
a fiber optic cable attached along its length to the deformable component such that the fiber optic cable is deformed when the floating-roof seal assembly is deformed;
a light source configured to transmit light along the fiber optic cable; and
a receiver configured to detect light from the fiber optic cable after it has interacted with the fiber optic cable.

In accordance with the present disclosure, there is also provided an apparatus for measuring the deformation in a floating-roof seal assembly comprising:

a deformable floating-roof seal assembly configured to span between a floating roof and components of a container;
a fiber optic cable attached along its length to the floating-roof seal assembly such that the fiber optic cable is deformed when the floating-roof seal assembly is deformed;
a light source configured to transmit light along the fiber optic cable; and
a receiver configured to detect light from the fiber optic cable after it has interacted with the fiber optic cable.

The deformable component may comprise the shell (e.g. which would deform if the tank is settling); a seal; and/or internal pillars (which would deform if the roof is resting on one pillar). It will be appreciated that some of the components of the tank may elastic or resilient (e.g. the seal) whereas others may be inelastic (e.g. the shell or pillars). That is, any deformation of inelastic components may be indicative of unwanted deformation, whereas deformation of elastic components may be used to monitor the normal use of the tank.

The control unit may comprise a processor and memory. The memory may store computer program code. The processor may comprise, for example, a central processing unit, a microprocessor, an application-specific integrated circuit or ASIC or a multicore processor. The memory may comprise, for example, flash memory, a hard-drive, volatile memory. The computer program may be stored on a non-transitory medium such as a CD. The computer program may be configured, when run on a computer, to implement methods and processes disclosed herein.

BRIEF DESCRIPTION OF THE DRAWINGS

Various objects, features and advantages of the invention will be apparent from the following description of particular embodiments of the invention, as illustrated in the accompanying drawings. The drawings are not necessarily to scale, emphasis instead being placed upon illustrating the principles of various embodiments of the invention. Similar reference numerals indicate similar components.

DETAILED DESCRIPTION

Introduction

Figure 1:
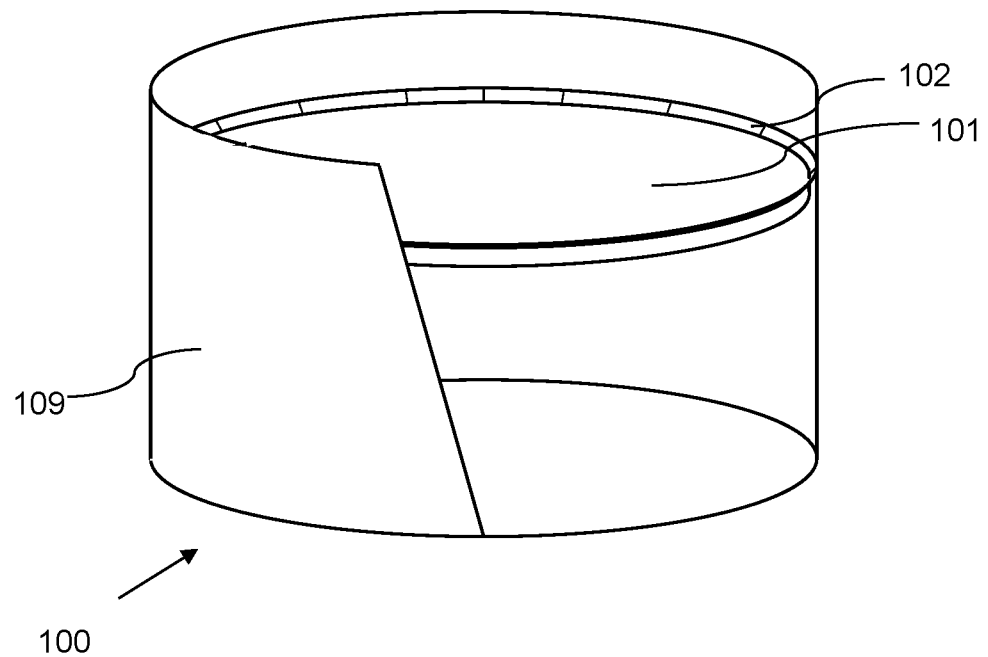
FIG. 1 is a cut-away perspective view of a floating-roof tank.

The present disclosure relates to apparatus and methods for measuring the deformation in a floating-roof seal assembly. A fiber optic cable is attached along its length to the floating-roof seal assembly such that the fiber optic cable is deformed when the floating-roof seal assembly is deformed. Deformation of the fiber optic cable and the seal assembly can be determined based on how the light interacts with the fiber optic cable. This helps allow tanks with a floating roof to be monitored.

This may help to enhance storage tank owner's ability to protect the environment in line with the mandatory environmental protection agencies (such as the US EPA) and greatly improve the efficiency of Industrial Code Compliance. This technology may help enable continuous monitoring of the storage tank's floating roof, seals, shell deformation, shell settlement and internal column/pillar status.

An inner column may be a gauge pole. A gauge pole is typically not designed to hold vertical pressures or loads. They are generally heavily slotted to allow liquid to flow through the slots. They are designed to be a conduit for physical plumb bobs or radar gauging down for measurements of liquid level height and measurement from the floor plate to the top of the gauge pole reference point. They may also act as an anti-rotation device for the floating roof.

Gauge poles are typically relatively close to the shell in proximity for ease of access (e.g. while on the stairway platform). The hatch is open to the gauge pole and they can take measurements from within the gauge pole conduit. However, a gauge pole may be subject to deformation and hinder or impede the floating roof, especially when the tilt is towards the shell and or a pinch point is created.

It may also reduce the need for a tank to be taken out of service. A single tank being out-of-service cost owners and producers anywhere from $8,000 to $500,000USD per day.

Floating roof seals typically are required to be inspected every year at a minimum for their tightness against the shell. In the U.S. if they are not compliant the EPA requires the owners to repair, adjust the seals or repair the tank to bring the tank back into compliance. The EPA generally gives only 45 days for the repair to be complete before fines are issued. The continuous monitoring of the seals may allow tanks to be tracked and operators notified of potential problems in advance to allow them to have more time to meet the regulatory requirements.

Existing inspection schedules have been unsatisfactory because they still all depend on inspection time intervals, have high costs, put inspectors in potentially dangerous situations, only capture a relatively small amount of data, do not turn around data fast enough to the clients and are not integrated enough to really enhance the owner, engineer, inspector and data collector.

The technology relates to providing tanks with equipment (e.g. which may be integral to the seal or provided as a retro-fit package) that is able to monitor, trend and notify of the storage tanks structural status, structural shell deformation compliance, floating roof status and floating roof seals status.

The deformable or flexible nature of the seal will help provide the ability to detect, measure and display anything happening to the seal and its contact with the shell. Also important is to know the rim space between the floating roof and the tank shell as it can change due to shell settlement and shell deformation causing: seal openings; emissions escape; and/or collision points that may damage the seal, floating roof or internal columns.

Various aspects of the invention will now be described with reference to the figures. For the purposes of illustration, components depicted in the figures are not necessarily drawn to scale. Instead, emphasis is placed on highlighting the various contributions of the components to the functionality of various aspects of the invention. A number of possible alternative features are introduced during the course of this description. It is to be understood that, according to the knowledge and judgment of persons skilled in the art, such alternative features may be substituted in various combinations to arrive at different embodiments of the present invention.

Floating Roof Tank

FIG. 1 shows a perspective cut-away view of an embodiment of an external floating roof tank 100. A floating roof tank is a storage tank which is commonly used to store large quantities of petroleum products such as crude oil or condensate. In this case, the tank comprises an open-topped cylindrical steel container with a shell 109 equipped with a roof 101 that floats on the surface of the stored liquid. The roof rises and falls with the liquid level in the tank.

In this case, the roof comprises a deformable seal 102 which spans the gap between a rigid section of the floating roof and the shell 109 to help prevent gas from escaping from the tank.

In some embodiments, the roof may have support legs hanging down into the liquid. These allow the roof to land at low liquid levels the roof which then allows a vapor space to form between the liquid surface and the roof, like a fixed roof tank.

Circular Fiber Optic Cable

Figure 2:
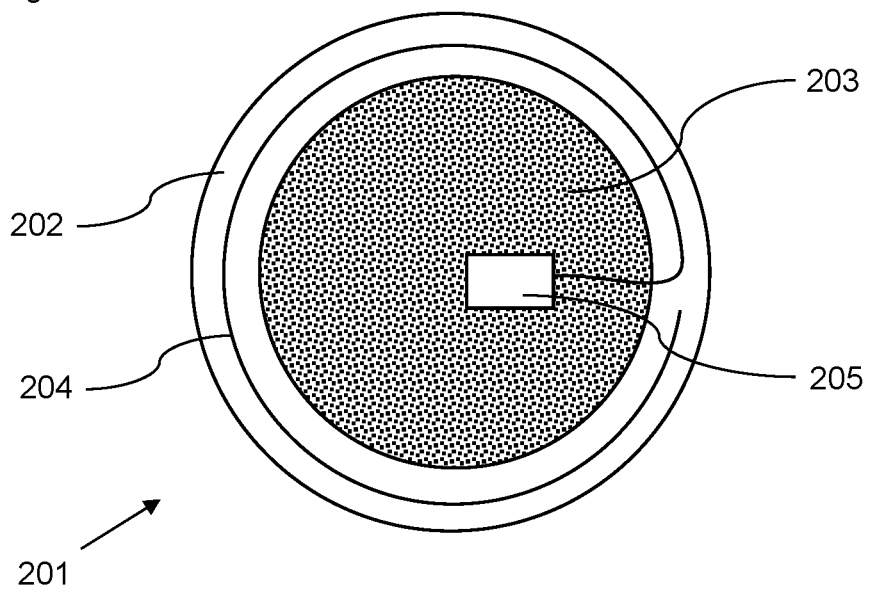
FIG. 2 is a top view of a floating-roof comprising an embodiment of an apparatus for measuring the deformation in a floating-roof seal assembly.

FIG. 2 is a schematic top view of a floating roof which could be used with the tank of FIG. 1. In this case, the size of the seal assembly 202 has been shown relatively larger than the rigid roof section for greater clarity. In conventional tanks, the rigid roof section 203 may be between 100 to 300 ft diameter. The space between the rigid roof section 203 and the shell may be typically 5-20 inches (e.g. 10±4 inches). The rigid section in this case comprises floats to allow the roof to float on the liquid contained within the container.

FIG. 2 depicts an apparatus for measuring the deformation in a floating-roof seal assembly comprising:
 a deformable floating-roof seal 202 assembly configured to span between a rigid section 203 of a floating roof 201 and components of a tank shell;
 a fiber optic cable assembly comprising a fiber optic cable 204 attached along its length to the floating-roof seal assembly 202 such that the fiber optic cable is deformed when the floating-roof seal assembly is deformed;
 a light source configured to transmit light along the fiber optic cable; and
 a receiver configured to detect light from the fiber optic cable after it has interacted with the fiber optic cable.

In this case, the light source and receiver are contained within a control unit 205.

In this case, the floating-roof seal assembly comprises a skirt 202 of resilient material. The floating-roof seal assembly is configured to span a gap between a rigid section of the floating roof and walls of a tank shell.

As the roof 201 moves with respect to the shell, the skirt deforms. As the floating-roof seal assembly deforms, the fiber optic cable assembly, which is attached along its length to the floating-roof seal assembly, also deforms. This allows the deformation of roof movement with respect to the shell to be monitored and recorded. The fiber optic cable assembly may be between 200 ft and 1.5 km.

It will be appreciated that there may be several reasons why the roof is moving with respect to the shell, and each may have particular deformation characteristics.

For example, the roof may move with respect to the shell because liquid is coming into or going out of the tank. This may cause the skirt to bend upwards as the roof falls when liquid is removed, and to bend downwards as liquid is introduced into the tank. It will be appreciated that detecting the loss of liquid when no-one is supposed to be interacting with the tank may indicate a leak or unauthorized removal of liquid.

If sections of the seal deform, but not others, this may be indicative of a section of the shell itself settling. This can ultimately lead to failure in the shell and loss of contained material.

If one or more harmonic deformations are detected, this may be indicative of an external force being applied to the tank. It will be appreciated that the normal vibrational modes of a tank will be dependent on the type and volume of liquid stored in the tank. Such an external force may be caused by wind or seismic activity.

In this case, the fiber optic cable extends around at least ¾ of the diameter of the floating roof. Generally, the greater proportion of the diameter of the tank is monitored, the more accurate the results may be. In this case, the apparatus has a single fiber optic line. In other embodiments, the apparatus may comprise multiple lines, each of which detect deformation in a different azimuthal range of the seal assembly. For example, one embodiment may have four fiber optic lines, each being configured to detect deformation in a different quadrant of the floating roof seal assembly.

The apparatus of claim 1, wherein the fiber optic cable comprises one or more fiber Bragg gratings. A fiber Bragg grating (FBG) is a type of distributed Bragg reflector constructed in a segment of optical fiber that reflects particular wavelengths of light and transmits all others. This is achieved by creating a periodic variation in the refractive index of the fiber core, which generates a wavelength-specific dielectric mirror. A fiber Bragg grating can therefore be used as an inline optical filter to block certain wavelengths, or as a wavelength-specific reflector.

Seal Types

Figure 3:
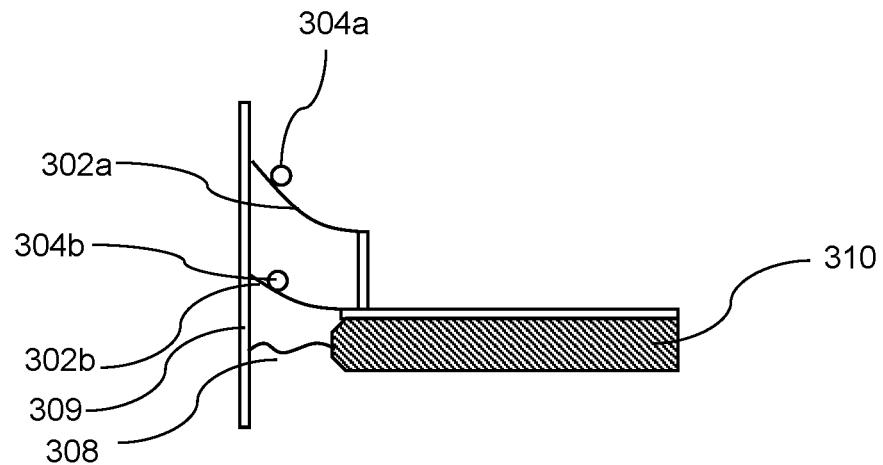
FIG. 3 is a side cross-section view of an embodiment of a floating-roof seal assembly.
Figure 4:
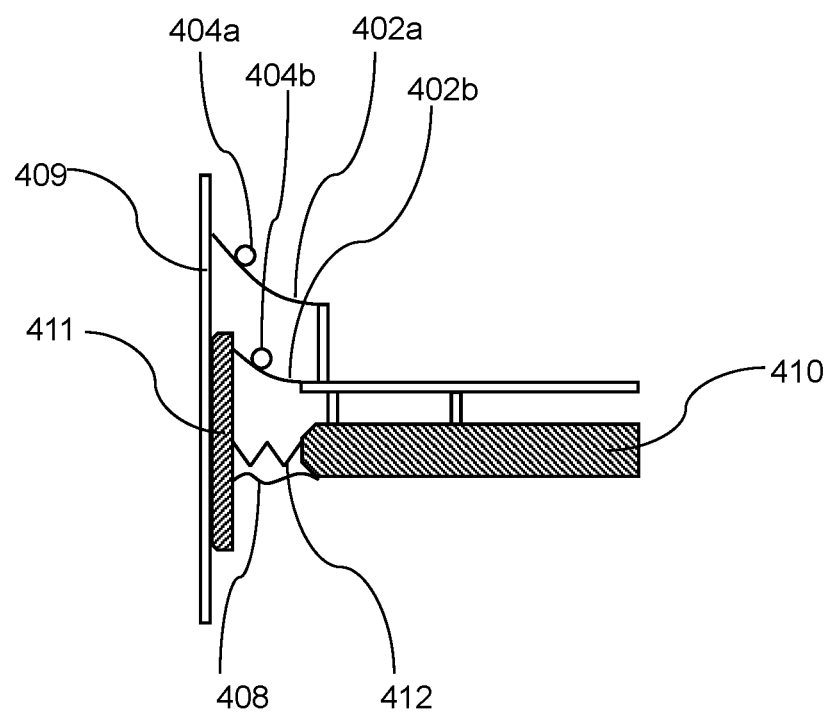
FIG. 4 is a side cross-section view of a further embodiment of a floating-roof seal assembly.

FIGS. 3 and 4 show cross-sectional views of two floating-roof seal assemblies.

FIG. 3 depicts a double wiper seal assembly. In this case, the rigid section of the floating roof comprises a float 310 configured to float on top of the liquid 308. On the surface above the float there is a lower wiper seal 302b and scaffolded above the lower wiper seal is a second upper wiper seal 302a. Each wiper seal 302a,b is provided with a respective fiber optic cable 304a,b configured to allow deformation to be detected on both seals independently.

In this example, the two wiper seals 302a,b have a similar construction. For example, they may have similar shapes and elastic properties. This means that as the floating roof moves up and down within the shell 309, the deformations experienced by the two seals should be similar. For example, if the roof is descending and the bottom seal deforms to compensate for a weld in the tank shell, the top seal should also deform later at the same azimuthal angle to accommodate the same weld based on the distance between the seals and the rate of descent. Therefore, by cross-referencing the two seal deformations at different heights, the rate of change of height of the roof with respect to the shell can be determined.

FIG. 4 shows an alternative seal configuration, again with multiple fiber optic cables, each fiber optic cable being attached along its length to a different deformable component of the floating-roof seal assembly. As with the previous embodiment, in this case, the rigid section of the floating roof comprises a float 410 configured to float on top of the liquid 408.

In this case, the seal assembly comprises a mechanical seal. The mechanical seal assembly comprises an upper wiper seal 402a (similar to the upper wiper seal of FIG. 3) and a shoe seal. In this case, the shoe 411 (a planar plate) is pushed towards the tank shell 409 by a pusher spring 412. Between the shoe and the roof, there is a continuous seal 402b. Both the upper wiper seal 402a and the continuous seal 402b are connected to the rigid section of the roof. However, while the upper wiper seal is configured to slide along the inner surface of the shell 409, the continuous seal 411 is connected to the shoe 411, and the shoe is 411 configured to slide along the inner surface of the shell 409. This may provide a more robust seal than the wiper seal because the seal has a larger contact area with the shell. In this case, both the upper wiper seal 402a and the continuous seal 402b are monitored using respective fiber optic cable sensor components 404a, b.

In this case, a comparison may be made between the deformation of the upper and lower components. In addition, the apparatus may also allow the upper and lower components to be independently monitored. For example, if a pusher spring 412 broke, the lower fiber optic cable may be configured to detect unusual deformation (e.g. especially if the deformation of the upper wiper seal appeared normal) without a person having to remove the upper wiper seal to perform an inspection.

It will be appreciated that other seal types may be used. For example, other embodiments may comprise a foam block sealed within an envelope.

Control Unit

Figure 5:
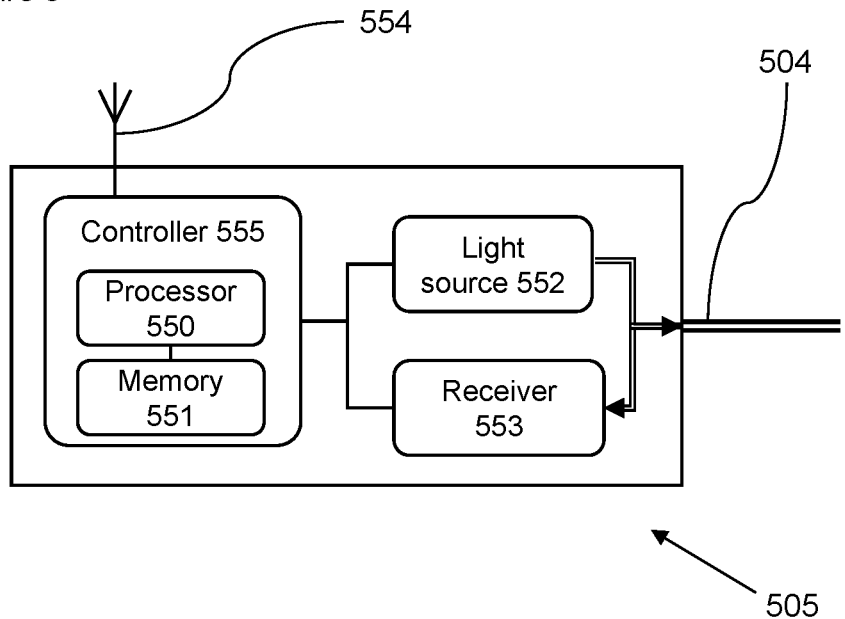
FIG. 5 is a schematic of a control unit of an embodiment of an apparatus for measuring the deformation in a floating-roof seal assembly.

FIG. 5 shows a schematic representation of the control unit 505 which may be used in conjunction with other embodiments described herein. The control unit 505 comprises a light source 552 configured to generate light which is directed into the fiber optic cable 504. In most cases, this light source will be a laser.

The control unit also comprises a light receiver 553 (e.g. a photodetector) configured to detect light from the fiber optic cable. The light received will contain artefacts which are due to how the fiber optic cable has been deformed. In many cases, the light received will be back-scattered light.

In this case, the apparatus control unit 505 comprises a controller 555 comprising a processor 550 and memory 551. The memory on this case comprises computer program code configured to be run on the processor. The computer program code may be stored on a non-transitory medium (e.g. CD or DVD).

The controller 555 in this case is configured to:
receive data from the receiver 553; and
determine a measure of spatially resolved deformation of the fiber optic cable 504 based on the received data.

It will be appreciated that fiber optic cable assemblies comprising multiple fiber optic cables may also be used.

In this case, spatially resolved means that the detected deformation is associated with a particular length along the fiber optic cable axis. As how the fiber optic cable is connected to the seal assembly is known, this information can be used to deduce how the seal assembly is being deformed.

As discussed in Lu et al. (A Review of Methods for Fibre-Optic Distributed Chemical Sensing, Sensors 2019, 19, 2876; doi:10.3390/s19132876), DCS, as a distributed fiber sensing (DFS) technique, is capable of employing the entire optical fiber as the sensing element and of providing measurements with a high degree of spatial density. The spatial information is usually resolved through optical time domain reflectometry (OTDR) or optical frequency domain reflectometry (OFDR). In an OTDR apparatus, an optical pulse is launched into the fiber, and the backscattered light intensity is measured as a function of time.

The distance along the fiber to which a given backscatter component corresponds is determined by time-of-flight considerations, and the spatial resolution is commonly defined as half of the pulse length. Finally, the obtained signal is processed to retrieve the spatial information.

The backscattered signal comprises Rayleigh, Raman, and Brillouin scattering processes inside an optical fiber. Different types of distributed sensor are often classified in terms of what backscattered component they are designed to measure. Rayleigh scattering is an elastic process, in which there exists no energy transfer between the incident light and the medium; thus, the backscattered light exhibits no frequency shift compared to the laser input. On the other hand, inelastic scattering, e.g., Brillouin and Raman scattering, requires an energy exchange between the light and the material; thus, the frequency of the scattered light is expected to shift from the incident light, as illustrated in FIG. 2. For silica fibers with an incident light at 1550 nm, the frequency shifts of Brillouin scattering and Raman scattering are about 11 GHz and 13.2 THz, respectively.

In this case, the apparatus comprises a wireless transceiver 554 for transmitting data from the apparatus to a remote computer. In this case, the controller is configured to determine the deformation of the fiber optic cable and the sealing assembly and to transmit the determined deformation profile of the seal assembly to a remote computer. It will be appreciated that this may increase the processing capacity required by the local controller and reduce the amount of data that needs to be transmitted to the remote computer.

In other embodiments, the controller may be configured to transmit the data detected by the light receiver to the remote computer. In such embodiments, the remote computer may be configured to perform the calculations to deduce the deformation profile based on the received data.

In this case, the apparatus is configured to provide an alert when the deformation meets one or more predetermined criteria. For example, an alert may be generated when a deformation is detected which corresponds to the roof falling or rising when authorized removal or filling of liquid is not taking place. Or an alert may be generated when deformation of the shell exceeding a predetermined threshold is detected.

In this case, the apparatus is configured to continuously monitor deformation. Interrogators can sample at very high rates. 500 msec would allow many sensors to be monitored at once Deformations would be detected using a multicore cable (e.g. 7 core). The shape is discerned by differences in strains between the individual fibers. This requires the proper orientation of the fibers.

Undulating Fiber Optic Cable

Figure 6:
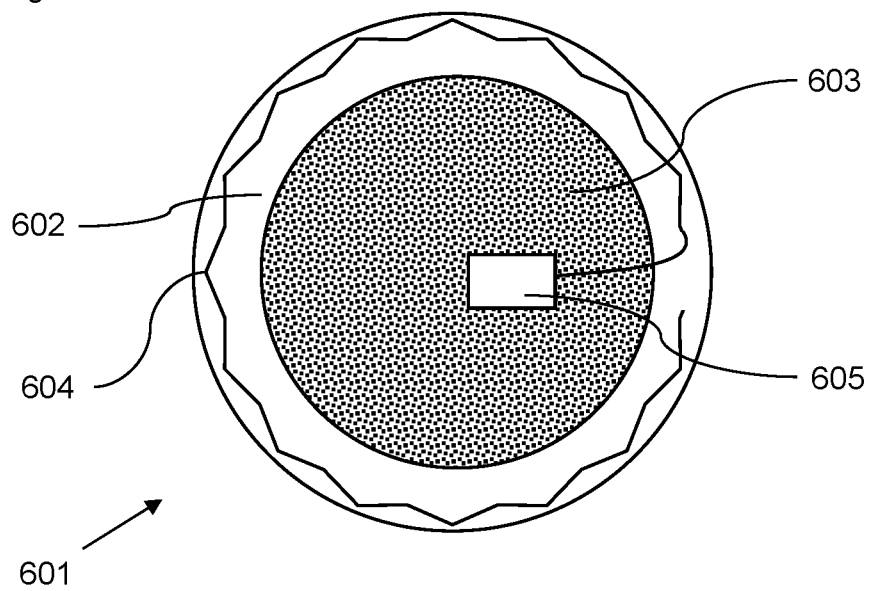
FIG. 6 is a top view of a floating-roof comprising a further embodiment of an apparatus for measuring the deformation in a floating-roof seal assembly.

FIG. 6 is a top view of an embodiment of a roof which may be used in conjunction with the tank of FIG. 1.

FIG. 6 depicts an apparatus 601 for measuring the deformation in a floating-roof seal assembly comprising:
- a deformable floating-roof seal assembly 602 configured to span between a rigid portion 603 of a floating roof and components of a tank shell;
- a fiber optic cable assembly comprising a fiber optic cable 604 attached along its length to the floating-roof seal assembly such that the fiber optic cable is deformed when the floating-roof seal assembly is deformed;
- a light source configured to transmit light along the fiber optic cable; and
- a receiver configured to detect light from the fiber optic cable after it has interacted with the fiber optic cable.

The light source, receiver and associated electronic are located within a control unit 605.

In this case, the floating-roof seal assembly comprises a skirt 602 of resilient material. The floating-roof seal assembly is configured to span a gap between a rigid section of the floating roof and walls of a tank shell.

As the roof moves with respect to the shell, the skirt 602 deforms. As the floating-roof seal assembly deforms, the fiber optic cable, which is attached along its length to the floating-roof seal assembly, also deforms. This allows the deformation of roof movement with respect to the shell to be monitored and recorded.

Unlike the embodiment of FIG. 2, in this case fiber optic cable 604 and the fiber optic cable assembly undulates with respect to a sealing axis of the seal assembly. The sealing axis, in this case, is a circular axis which extends around the diameter of the roof. That is, the sealing axis in this case is an axis of constant radius around the roof where the seal interacts with the shell. In this case, the undulations describe how, as you move around the sealing axis (with increasing azimuthal angle), the distance between the fiber optic cable cyclically increases and decreases.

This arrangement may have a number of advantages. Firstly, in many cases, because the seal is deformable, there may be situations where tensile strain is applied along the length of the fiber optic cable which may be damaging to the cable. The undulations may an expansion in the sealing assembly parallel to the sealing axis to be accommodated by straightening out the undulations rather than applying a tensile strain to the fiber optic cable along its length.

Secondly, the sealing assembly may have a number of modes of deformation. For example, if the roof is moving upwards and downwards within the shell, the skirt in this case will deform upwards and downwards, but there will be much smaller deformations around the sealing axis because every point of the skirt around the diameter will be experiencing forces. In this case, a fiber optic cable which runs parallel to the sealing axis may be less sensitive to deformations which affect all points in the seal in the same way. If part of the shell is sinking, then different parts of the seal will experience different deformations. That is the deformation will be different as a function of distance along the sealing axis. By having an undulating fiber optic cable, the apparatus may be sensitive to both these mode as the fiber optic cable will deform both when the deformation has a component aligned with the sealing axis (deformation as a function of azimuthal angle in this case) and when the deformation has a component aligned perpendicular to the sealing axis (deformation as a function of radial distance in this case).

In this case, the Bragg gratings may be configured to be arranged in the sections of the fiber-optic cable which is not parallel to the sealing axis (e.g. the sections which are at angle to the sealing axis).

Tank with Internal Columns

Figure 7A:
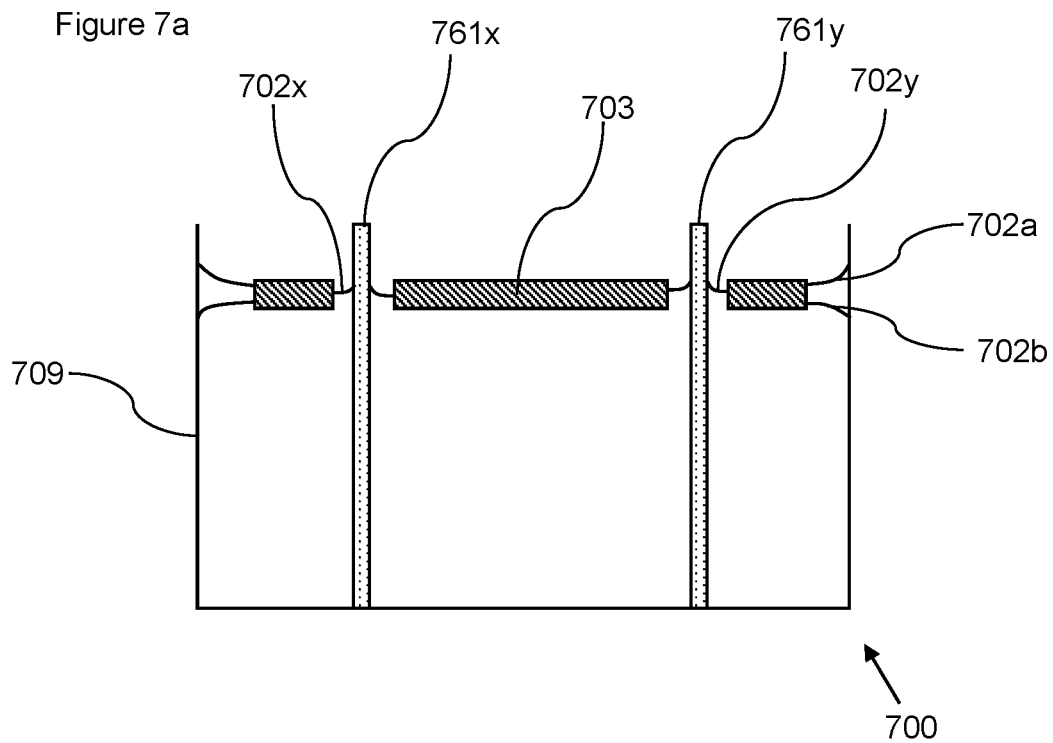
FIG. 7a is a side cross-section view of a floating-roof tank.
Figure 7B:
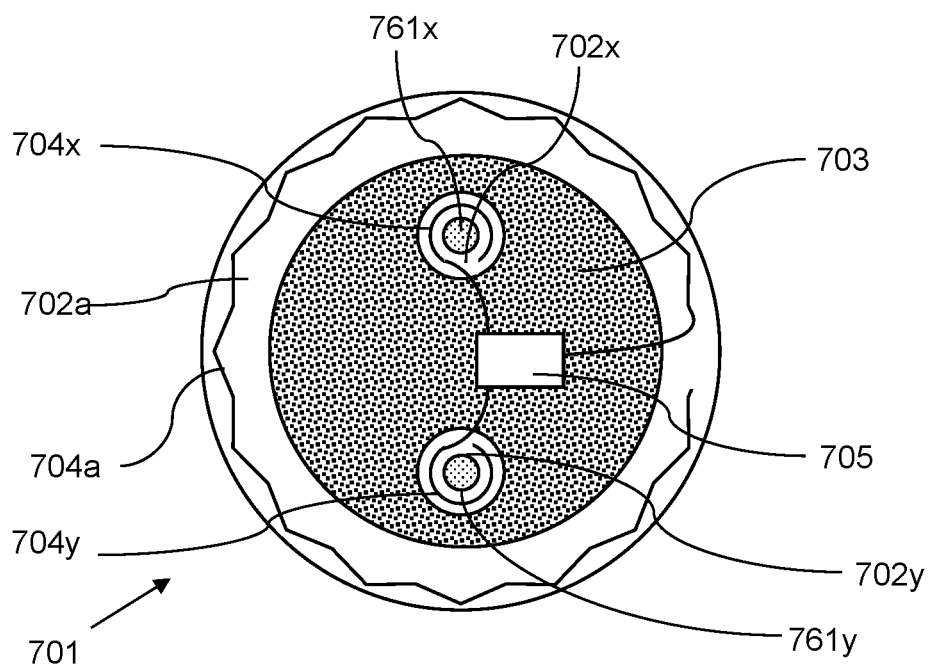
FIG. 7b is a top view of the floating-roof of FIG. 7a comprising the embodiment of an apparatus for measuring the deformation in a floating-roof seal assembly.

FIGS. 7a and 7b depict a further embodiment of a tank 700 with a container having a shell 709 and a floating roof 701. FIG. 7a is a side cross-section view and FIG. 7b is a top view the roof.

Unlike the previous embodiments, in this case, the container comprises multiple internal columns 761x, 761y which pass through a rigid section 703 of the floating roof to help guide the floating roof up and down as liquid is introduced into or removed from the tank 700.

FIG. 7b depicts an apparatus for measuring the deformation in a floating-roof seal assembly comprising:
- a deformable floating-roof seal assembly 702a, 702b, 702x, 702y configured to span between a floating roof and components of a container;
- fiber optic cable assemblies, each having a fiber optic cable 704a, 704x, 704y attached along its length to the floating-roof seal assembly such that the fiber optic cable is deformed when the floating-roof seal assembly is deformed;
- a light source configured to transmit light along the fiber optic cable; and
- a receiver configured to detect light from the fiber optic cable after it has interacted with the fiber optic cable.

The light source, receiver and associated electronic are housed in a control unit 705 in this case.

In this case, the tank comprises multiple floating-roof seal assemblies: a shell sealing assembly 702a, 702b and first 702x and second 702y internal column sealing assemblies.

In this case, the shell sealing assembly 702a, 702b is configured to span a gap between a rigid section of the floating roof and the walls of a tank shell 709 and comprises a two skirt of resilient material 702a, 702b. In this case, the upper skirt 702a is configured to curve upwards from the floating roof, and the lower skirt 702b is configured to curve downwards from the floating roof.

In this case, each of the internal column sealing assemblies 702x, 702y is configured to span a gap between a rigid section of the floating roof and an internal column within the tank shell and comprises a single skirt of resilient material.

Each of the skirts 702a, 702b, 702x, 702y in this embodiment is provided with a fiber optic cable 704a, 704x, 704y for measuring and monitoring deformation.

As the roof moves with respect to the shell, the skirts deform. As the floating-roof seal assembly deforms, the fiber optic cable, which is attached along its length to the floating-roof seal assembly, also deforms. This allows the deformation of roof movement with respect to the shell to be monitored and recorded.

In this case, the controller is configured to cross-reference the deformation of the various skirts to detect possible issues. For example, if the deformation of the shell sealing assembly varies around the shell sealing axis, and there are different deformations detected from the internal column sealing assemblies, this may be indicative of either a portion of the tank settling or that the roof is tilting.

The controller may also be configured to detect issues based on results from individual fiber optic cables. For example, if the deformation on a single internal column sealing assembly exceeds a predetermined value, this may be indicative of a problem with that internal column alone. It will be appreciated that, if the roof is free to move with respect to the shell and all the internal columns except one, if liquid is removed, then the full weight of the roof may be applied to that one internal column which may lead to that internal column bending or breaking.

In addition, by monitoring the spatial data around the columns the system may be configured to detect one or more of the following:
   column tilt and direction;
   column deformation;
   pinch points between column penetration points;
   pressure or strain against the floating roof or columns with respect to the Columns;
   column twist for non-cylindrical columns (e.g.: Wide flange Beam, I-Beam or "API Style columns).
   change in cross-sectional shape or size (e.g. detecting cylindrical columns that have change in diameter due to heavy corrosion or elongation); and
   floating roof rotation and/or spin direction (e.g. by correlating results from multiple columns).

Detecting characteristic vibrations of columns may be able to indicate if detachment has occurred at the bottom of the column or at the top where welds and bolting should be secure and "sound".

In addition, the column vibrations and "movement" provide information regarding the forces that are being exposed to the fixed roof, the column base plates and adjacent floor plate area.

In some embodiments, a vertical optic cable (multicore) may be attached directly to the columns. This may allow the deformation of the column to be measured directly. For example, the cable may be attached to the column in a vertical configuration or twisted around the column in a helical configuration. As with the sealing assembly apparatus, the column fiber optic cable would have an associated controller; light source configured to transmit light along the fiber optic cable; and receiver configured to detect light from the fiber optic cable after it has interacted with the fiber optic cable.

Retrofitting Deformation Measuring Equipment

In some cases, the fiber optic cable may be embedded within the deformable sealing assembly. In other embodiments, the fiber optic cable may be attached to the deformable sealing assembly. This may be achieved by gluing the fiber optic cable to the sealing assembly using a resilient adhesive such as cyanoacrylate adhesives. For improved flexibility Permabond 731, 735, 737 or 2050 may be used.

Fault Detection

Figure 8:
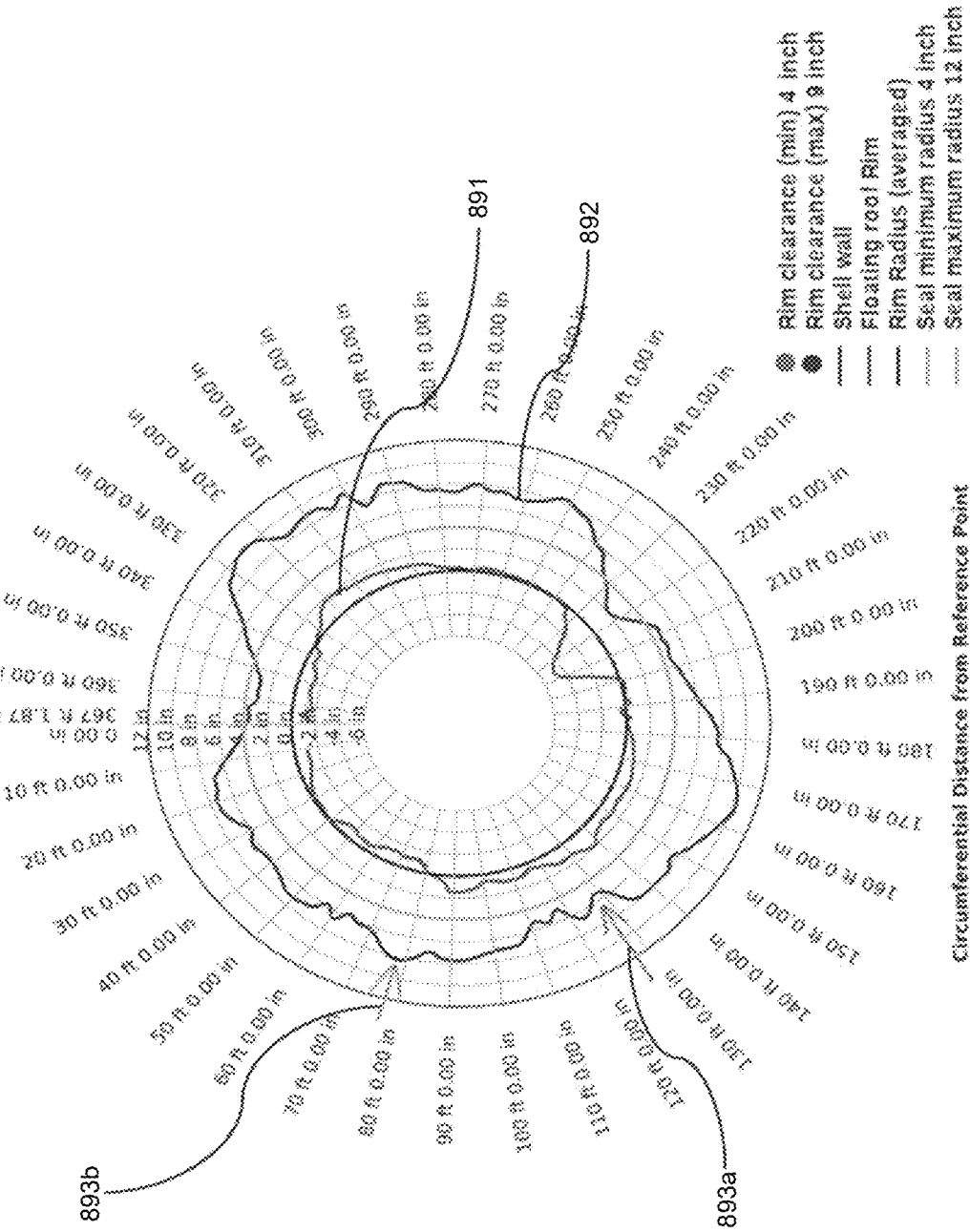
FIG. 8 is a graph in circular coordinates of the shape of the shell and rigid portion of the floating roof spanned by the sealing assembly.

FIG. 8 shows deformation data corresponding to a seal when in use. In this case, the data is presented in circular coordinates and shows the deviation of the shell 892 and the outer rim of the rigid section of the floating roof 891 from being circular at the height of the seal. The distance between these two lines represent the gap spanned by the sealing assembly.

From this, the apparatus is configured to determine whether the deformation is within acceptable parameters. The apparatus is configured to measure absolute deformation values and rate of change of deformation values to determine if the tank is structurally sound.

In this case, the program has identified the minimum distance 893a and the maximum distance 893b between the rigid section and the shell. It will be appreciated that the distance in this case is defined as the distance between the rigid section and the shell at a particular height and azimuthal angle.

From these values, various parameters may be calculated and compared with predetermined values. The parameters may include:
   Average gap dimension;
   gap area; and
   deviation of shell from circular.

These values may be compared with predetermined threshold values to determine whether the tank satisfies one or more structural integrity criteria. If the tank does not meet the criteria, the apparatus in this case is configured to notify the user to allow the tank to be emptied and/or repaired in good time.

Fiber Optic Cable Configuration

Figure 9:
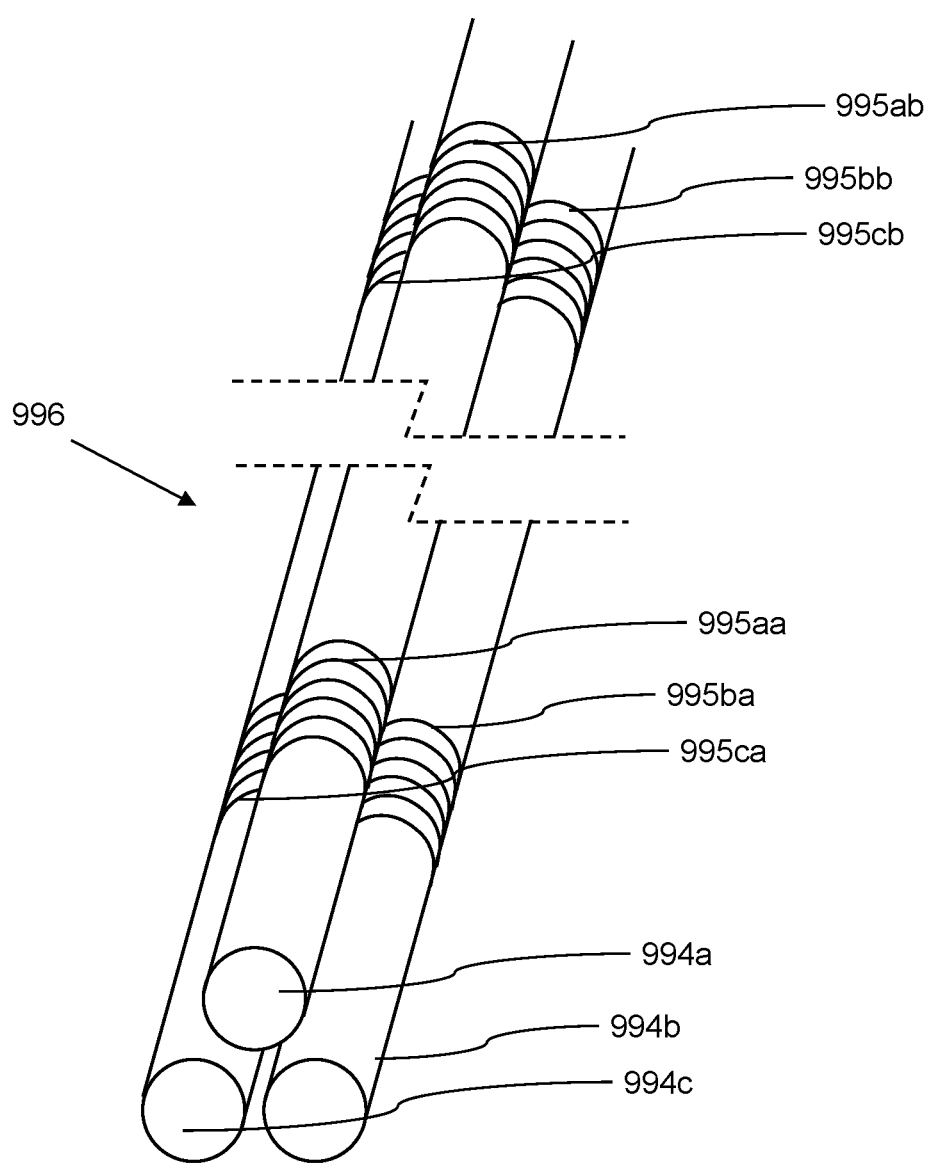
FIG. 9 is a perspective view of a fiber optic cable assembly comprising three fiber optic cables with Bragg gratings.

FIG. 9 shows a configuration of three fiber optic cables 994a-c forming part of a fiber optic cable assembly 996. In this case, the cables are arranged in a triangle configuration. Each cable comprises a series of Bragg gratings 995aa-ab, 995ba-bb, 995ca-cb which are aligned with each other. That is, the multiple fiber optic cables comprise respective Bragg gratings which are positioned at the same axial distance along the cables so that information about the same part of the tank can be determined from the Bragg gratings of the multiple fiber optic cables.

The Bragg gratings may be spaced apart between 0.25-1 meters (center to center) along the cable axis. Each cable may comprise at least 10 Bragg gratings. Each cable may have fewer than 50 or fewer than 100 Bragg gratings. Each Bragg grating may have a length of between 5 and 20 mm (e.g. 10 mm) along the axis of the cable.

The fiber optic cable may comprise a Technica™ T130 cable. The cable may be configured to use wavelengths of more than 1532 nm continuous wave with a wavelength tolerance of ±0.5 nm or less. The bandwidth of the light source (full width half maximum—FWHM) may be less than 0.2 nm.

Increasing the spacing between the fiber optic cables may increase the sensitivity of the sensors. The center to center spacing between neighboring fiber optic cables may be between 1 and 3 mm. A center to center spacing of 2 mm is known to provide a curvature resolution of $3.6 \times 10^{-3}$ $m^{-1}$.

Figure 10:
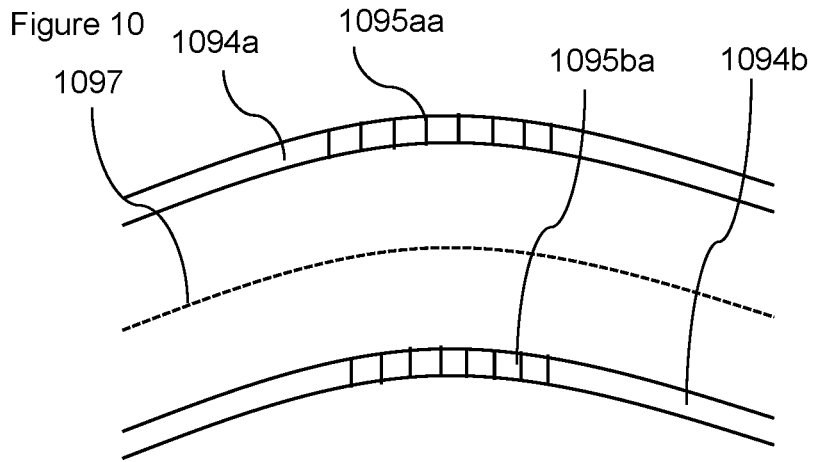
FIG. 10 is a schematic view of a fiber optic cable assembly showing how bending curvature can be determined.

The cable assembly design is based on the bend measurement differential principle by means of two Bragg Grating elements located on different sides of its structure (see FIG. 10). In this case, the figure shows how curvature in the plane of the page can be measured by two fiber optic cables 1094a, 1094b arranged on either side of a fiber optic cable assembly axis 1097. Each cable comprises a respective Bragg grating 1095aa, 1095ba arranged at the same length along the optic cable assembly axis 1097 (also known as the neutral axis).

In the situation depicted in FIG. 10, the fiber optic cable assembly is bent downwards at either side. This causes tension in Bragg grating 1095aa in the upper fiber optic cable 1094a which increases the Bragg grating spacing; and compression in the Bragg grating 1095ba in the lower fiber optic cable 1094b which decreases the Bragg grating spacing. The difference in the change in Bragg grating spacings allows a measure of the curvature in the optic cable assembly axis 1097 to be determined.

Such an arrangement of the sensing elements increases the measurement accuracy and reduces the temperature influence, since it is the difference between different fiber optic cable readings that is used to measure the magnitude of the deformation, rather than absolute values. Measuring the magnitude of the bend in two directions requires the use of at least three sensing elements (e.g. in the plane of the seal and perpendicular to the plane of the seal).

Figure 11:
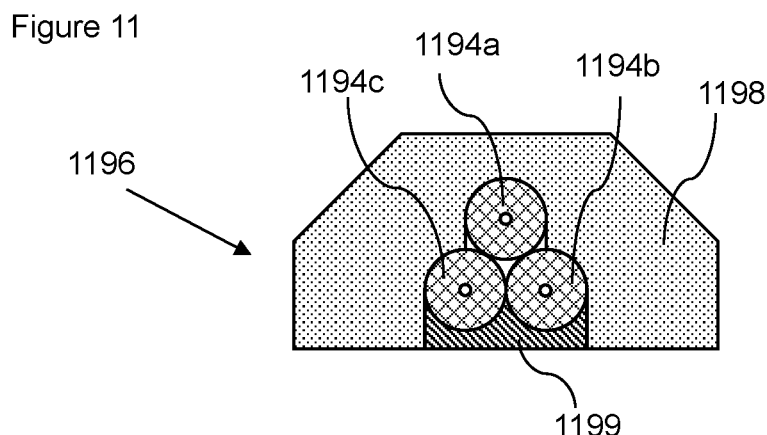
FIGS. 11 and 12 are cross-sectional views of two fiber optic cable assemblies.
Figure 12:
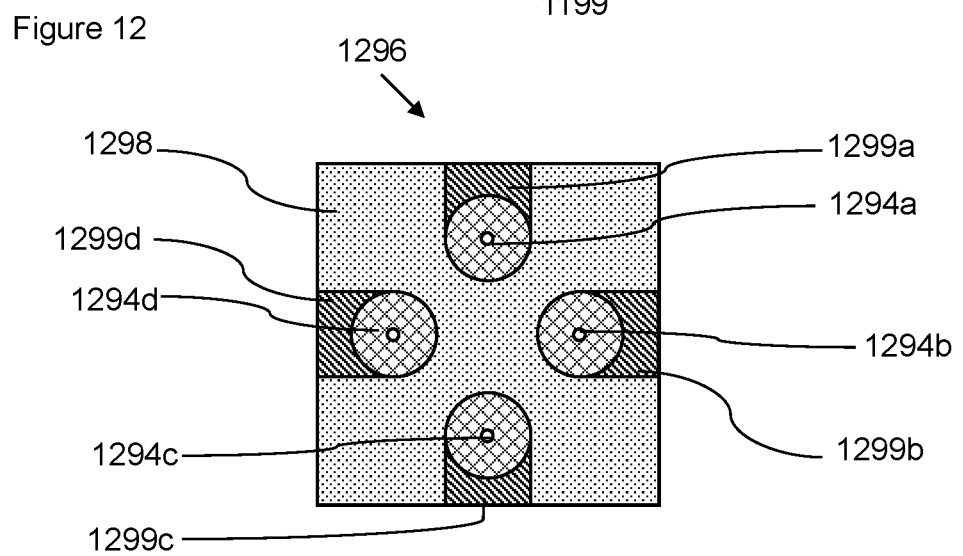

FIGS. 11 and 12 show two separate cross-sections of two cable assemblies 1196 and 1296. These assemblies can be used in conjunction with the embodiments described above.

Both the fiber optic cable assemblies 1196, 1296 use multiple single-core fiber optic cables 1194a-c, 1294a-d mounted within a substrate 1198, 1298. In these cases, the substrate is silica glass or acrylate. The substrate may be considered to be an elongate holder for holding different fiber optic cables in a particular orientation with respect to each other.

The substrate is extruded to facilitate mass production. In both cases, the substrate 1198, 1298 comprises one or more slots (or channels) for receiving one or more fiber optic cables. The slots are shaped to hold the fiber optic cables in a particular configuration with respect to each other. The substrate may comprise one or more flat surfaces to facilitate attaching the assembly to the seal assembly.

In the fiber optic cable assembly 1196 of FIG. 11, there is one slot which is shaped to receive three fiber optic cables 1194a-c in a triangle configuration. The slot has a shaped surface so that the first fiber optic cable inserted abuts a curved surface which holds it in place. The remaining two are held in place by abutting: other curved surfaces of the substrate; the first fiber optic cable; and each other.

In contrast, in the fiber optic cable assembly 1296 of FIG. 12, there is one slot for each of the four fiber optic cables 1294a-d. These slots ensure that the four fiber optic cables are held in a quadrilateral (e.g. square) configuration.

Both the fiber optic cable assemblies 1196, 1296 use reinforced fiber optic cables. In these cases, each fiber is coated with acrylate and configured to have a 1 mm outside diameter.

Because the fiber optic cables 1194a-c abut each other in the embodiment of FIG. 11, the spacing between cables is dictated by the outer diameter of the reinforcing (1 mm in this case). Other diameters may be used (e.g. between 1 and 3 mm) to adjust the sensitivity of the assembly.

By having separate slots, as in the embodiment of FIG. 12, the inter-cable spacing can be adjusted more easily. In the embodiment of FIG. 12, the center to center spacing of neighboring cables (e.g. between cables 1294a and 1294b) is 1.77 mm.

Both assemblies are configured to hold the fiber optic cables within the substrate using a bonding agent 1199, 1299a-d, such as acrylate-silica glass or acrylate-acrylate bonding. The bonding can act as an anchor for the fiber Bragg gratings or as a side anchor.

Other Options

Single or Multi-phase Fiber Optics as an applied nervous system type sensor to the Storage Tank Floating Roof Seal, Rim Space components and spacing around floating roof penetrations such as columns and gauge poles. Distributed fiber-optic sensing arrangement will utilize the Fiber Bragg Grating (FBG) as well as the Distributed chemical sensing (DCS).

The apparatus may be configured to allow distributed chemical sensing based on the spatially resolved interaction of the light with the fiber optic cable.

The apparatus may be configured to automatically detect deformation while the tank is being filled or liquid is being removed from the tank. For example, the apparatus may be turned on when a tank inlet or outlet is opened.

The apparatus may comprise a deformation fiber-optic cable sensor attached along its length to the outside of the container shell. For example, this fiber-optic cable sensor may be positioned on or adjacent to a weld and/or towards the bottom of the tank. This may allow settling of the tank to be measured more directly.

The apparatus may be configured to allow for measurement of the thickness of the tank shell. This may be performed by measuring characteristic vibrations of the deformation. For example, the system may be configured to perform a temporal Fourier transform to look for vibration frequencies. The frequency of the vibrations may be related to the thickness of the tank shell if the material is known (e.g. steel). The frequencies also be compared with a portion of the tank of known thickness and/or historical data to monitor thinning or corrosion.

Although the present invention has been described and illustrated with respect to preferred embodiments and preferred uses thereof, it is not to be so limited since modifications and changes can be made therein which are within the full, intended scope of the invention as understood by those skilled in the art.

The invention claimed is:

1. An apparatus for measuring deformation in a floating-roof seal assembly comprising:
   a deformable floating-roof seal assembly configured to span between a rigid section of a floating roof and components of a container;
   a fiber optic cable assembly comprising one or more fiber optic cables, each of the one or more fiber optic cables being attached along its length to the deformable floating-roof seal assembly such that each of the one or more fiber optic cables is deformed when the deformable floating-roof seal assembly is deformed;
a light source configured to transmit light along each of the one or more fiber optic cables;
a receiver configured to detect the light from each of the one or more fiber optic cables after the transmitted light has interacted with the said fiber optic cable; and
a controller configured to measure deformation of the fiber optic cable assembly and the deformable floating-roof seal assembly based on parameters of the detected light.

2. The apparatus of claim 1, wherein the fiber optic cable assembly comprises multiple fiber optic cables arranged in parallel about a common fiber optic cable assembly axis, and wherein the controller is configured to measure the deformation of the deformable floating-roof seal assembly using differences between the detected light from the one or more fiber optic cables within the fiber optic cable assembly.

3. The apparatus according to claim 1, wherein the deformable floating-roof seal assembly comprises one or more skirts of resilient material, and wherein the fiber optic cable assembly is attached along its length to the one or more skirts of resilient material.

4. The apparatus according to claim 1, wherein the apparatus is configured to monitor vibrations.

5. The apparatus according to claim 4, wherein the deformable floating-roof seal assembly is configured to identify characteristic frequencies corresponding to a position of the floating roof within the container.

6. The apparatus according to claim 4, wherein the apparatus is configured to compare a frequency of the monitored vibrations of with a portion of the container of known thickness and/or historical data to determine whether thinning and/or corrosion have occurred.

7. The apparatus according to claim 1, wherein at least one of the fiber optic cables undulates with respect to a sealing axis of the deformable floating-roof seal assembly.

8. The apparatus according to claim 1, wherein the controller is configured to determine a measure of spatially resolved deformation of the fiber optic cable assembly.

9. The apparatus according to claim 1, wherein the apparatus comprises a wired or wireless transceiver for transmitting data from the apparatus to a remote computer.

10. The apparatus according to claim 1, wherein at least one of the fiber optic cables comprises one or more fiber Bragg gratings, wherein deformation of the fiber optic cable assembly causes a Bragg grating spacing to change, and wherein the controller is configured to measure the deformation in the fiber optic cable assembly based on the Bragg grating changes.

11. The apparatus according to claim 10, wherein the fiber Bragg gratings are located in sections of the fiber optic cable assembly which is non-parallel to a sealing axis of the deformable floating-roof seal assembly.

12. The apparatus according to claim 1, wherein the apparatus is configured to allow distributed chemical sensing based on spatially resolved interactions of the light with each of the one or more fiber optic cables.

13. The apparatus according to claim 1, wherein the apparatus comprises multiple fiber optic cable assemblies, each of the multiple fiber optic cable assemblies being attached along its length to a different deformable component of the deformable floating-roof seal assembly.

14. The apparatus according to claim 1, wherein the apparatus comprises multiple fiber optic cable assemblies, each of the multiple fiber optic cable assemblies being configured to measure deformation at different azimuthal ranges.

15. The apparatus according to claim 1, wherein the apparatus comprises multiple fiber optic cable assemblies, each of the multiple fiber optic cable assemblies being configured to measure deformation at different heights.

16. The apparatus according to claim 1, wherein the apparatus is configured to provide an alert when a detected deformation exceeds a predetermined threshold and/or corresponds to the floating roof falling or rising when authorized removal or filling of liquid is not taking place.

17. The apparatus according to claim 1, wherein the apparatus is configured to continuously monitor deformation.

18. The apparatus according to claim 1, wherein the fiber optic cable assembly comprises an elongate extruded substrate with multiple slots, each slot holding a single-core fiber optic cable, wherein the elongate extruded substrate comprises one or more flat surfaces to facilitate attaching the fiber optic cable assembly to the deformable floating-roof seal assembly.

19. A retrofit apparatus for measuring deformation in a floating-roof seal assembly comprising:
a fiber optic assembly comprising one or more fiber optic cables configured to be attachable along its length;
a connector for attaching the fiber optic assembly along its length to a deformable floating-roof seal assembly configured to span between a rigid section of a floating roof and components of a container, such that the fiber optic assembly is deformed when the deformable floating-roof seal assembly is deformed;
a light source configured to transmit light along the one or more fiber optic cables;
a receiver configured to detect the light from the one or more fiber optic cables after it has interacted with the one or more fiber optic cables; and
a controller configured to determine deformation of the fiber optic assembly based on parameters of the detected light.

20. A method for measuring changes in a storage tank, the storage tank comprising:
a container for containing a liquid;
a floating roof comprising a float for floating on the liquid contained within the storage tank, and a deformable floating-roof seal assembly configured to span between a rigid section of the floating roof and components of the container;
a fiber optic cable assembly comprising one or more fiber optic cables attached along its length to the deformable floating-roof seal assembly;
a light source configured to transmit light along the one or more fiber optic cables; and
a receiver configured to detect light from the one or more fiber optic cables after it has interacted with the one or more fiber optic cables;
the method comprising:
transmitting light from the light source into the one or more fiber optic cables;
detecting light received from the one or more fiber optic cables after it has interacted with the one or more fiber optic cables; and
determining deformation of the fiber optic cable assembly based on parameters of the detected light.

* * * * *